United States Patent [19]

Lewin

[11] Patent Number: 4,716,080

[45] Date of Patent: Dec. 29, 1987

[54] SIZE COMPOSITION

[75] Inventor: David F. Lewin, Amarillo, Tex.

[73] Assignee: Owens-Corning Fiberglass Corporation, Toledo, Ohio

[21] Appl. No.: 36,412

[22] Filed: Apr. 9, 1987

Related U.S. Application Data

[62] Division of Ser. No. 868,382, May 29, 1986.

[51] Int. Cl.⁴ .......................... B32B 9/00; B32B 15/00
[52] U.S. Cl. ..................................... 428/389; 523/503; 523/200; 523/206; 523/217; 523/501; 523/504
[58] Field of Search ............... 428/389; 523/503, 200, 523/206, 217, 501, 504

[56] References Cited

U.S. PATENT DOCUMENTS

| 4,284,538 | 8/1981 | Graham | 428/441 |
| 4,370,169 | 1/1983 | Graham | 106/267 |
| 4,381,199 | 4/1983 | Graham | 106/267 |
| 4,457,785 | 7/1984 | Hsu et al. | 106/308 N |
| 4,473,618 | 9/1984 | Adzima et al. | 523/503 |
| 4,536,447 | 8/1985 | Hsu | 428/375 |

Primary Examiner—Joseph L. Schofer
Assistant Examiner—N. Sarofim
Attorney, Agent, or Firm—Patrick P. Pacella

[57] ABSTRACT

Chrome-free aqueous size compositions containing quanternary salts reduce fuzz and fly in glass fiber gun roving. The roving particularly achieves a desirable ease and completeness of chopping in conventional chopping and spraying equipment for molding operations.

3 Claims, No Drawings

SIZE COMPOSITION

This is a division of application Ser. No. 868,382, filed May 29, 1986.

TECHNICAL FIELD

This invention relates to size compositions for glass fibers. More particularly, the sizes are for glass fiber gun roving.

BACKGROUND OF THE INVENTION

Compounders frequently reinforce polymeric or resinous materials with glass fibers. A very lightweight size composition typically coats the fibers to protect them from abrasion damage during processing and handling. The size compositions also tightly bind the fibers and integrate them into multi-fiber bundles or strands. The size also enhances the interaction between the fibers and matrix which they reinforce.

One of the industry's uses for glass fibers is as gun roving which desirably consists of a plurality of continuous strands. A winding operation weakly integrates the strands together with each strand consisting of a plurality of glass fibers. The gun roving then feeds through a chopper associated with a gun which sprays a fluid resin composition. The chopper and gun spray resin and chopped roving together onto a mold. The strands separate and imbed in the fluid resin. Cooling and curing subsequently solidify the combination into a molded part.

U.S. Pat. No. 4,473,618 discloses a substantially chrome-free aqueous sizing composition for glass fiber gun roving which comprises (A) a mixture of emulsified film-forming polymers comprising a polymer of vinyl acetate and ethylene, a polymer of vinyl acetate and an epoxy-functional vinyl monomer, and an unsaturated polyester resin; (B) titanium acetyl acetonate; (C) a silylated polyaminopolyamide hydrochloride or hydrolysate thereof; (D) a cationic lubricant; and (E) 3-methacryloxypropyltrimethoxysilane or hydrolysate thereof.

DISCLOSURE OF THE INVENTION

I have taken this very useful chrome-free size composition and improved it one step further by holding the amount of fuzz and fly to even more desirable low incidences. Fuzz results from fibers breaking during processing, and fly is static dispersed pieces of chopped strand. I have found that using a particular antistatic agent significantly reduces the amount of fuzz and fly. My use of quanternary ammonium salt (Quat) antistatic agents generates advantageously low levels of fuzz and fly. Specifically, I used a quanternary salt of ammonium of ethosulfate.

BEST MODE OF CARRYING OUT INVENTION

My invention comprises substantially chrome-free aqueous sizing composition for glass fiber gun roving which comprises (A) a mixture of emulsified film-forming polymers comprising a polymer of vinyl acetate and ethylene, a polymer of vinyl acetate and an epoxy-functional vinyl monomer, and an unsaturated polyester resin; (B) titanium acetyl acetonate; (C) quanternary ammonium salt; (D) a cationic lubricant; and (E) 3-methacryloxypropyltrimethoxysilane or hydrolysate thereof.

The emulsified film-forming polymer components of my invention may be any emulsified polymers of the types called for which will coalesce to form coherent films and which preferably will so coalesce at normal ambient workplace temperatures. A small amount of suitable plasticizer to aid in such coalescence, of which many are known and available, may be blended and co-emulsified with one or more of the polymers, if desired; but it is ordinarily found possible and preferable to select polymers which do not require such additives to exhibit advantageous characteristics in use. However, it is nonetheless desirable and preferred to include a latently reactive unsaturated plasticizer with the unsaturated polyester resin to ultimately react with an unsaturated polyester and with an unsaturated polyester matrix resin to more intimately bond the glass fibers to each other and to the matrix in which they are imbedded as reinforcing elements.

A particularly suitable emulsified polymer of vinyl acetate and ethylene is available as Airflex 410 (TM/Air Products and Chemicals Co.), an aqueous emulsion containing about 55% by weight non-volatiles comprising a vinyl acetate-ethylene copolymer having a glass transition temperature of about 2° C. non-ionically emulsified as particles of about 0.3 $\mu$m average diameter.

A particularly suitable emulsified polymer of vinyl acetate and an epoxy-functional vinyl monomer is available as Resyn 25-1971 (TM/National Starch and Chemical Corp.), an aqueous emulsion containing about 54.5±1% by weight non-volatiles comprising a copolymer of vinyl acetate with about 2% by weight of glycidyl methacrylate non-ionically emulsified.

A particularly suitable unsaturated polyester resin is available as MR70D (TM/United States Steel Corp.), an approximately 60:40 by weight blend of an unsaturated polyester and diallyl phthalate, a latently reactive plasticizer, which was non-ionically emulsified to form an aqueous emulsion containing about 59% by weight non-volatiles and designated PE-700.

A particularly suitable titanium acetylacetonate is available as Tyzor AA (TM/E. I. duPont de Nemours, Inc.), a 75% by weight solution or dispersion of bis(2, 4-pentanedionate-0,0)bis(2-propanolato) titanium in isopropanol.

A particularly suitable cationic lubricant is a weak acid salt of a partial fatty amide of a polyamine such as Emery 6760 U (TM/Emery Industries, Inc.), a 50% by weight aqueous solution or dispersion of an acetic acid salt of a partial amide of mixed fatty acids having about 6 to 8 carbon atoms with a polyethylenamine. The same material has also been available undiluted as Emery 6717.

A particularly suitable 3-methacryloxypropyltrimethoxysilane is available in a blend with a proprietary stabilizer as A-174 (TM/Union Carbide Corp.) The silane is preferably hydrolyzed in dilute aqueous weak acid before use.

While the proportions of the various components of the aqueous sizing compositions of my invention are not narrowly critical, it is preferred that they be within about the following ranges:

| Component | Preferred Weight % |
| --- | --- |
| Emulsified polymer of vinyl acetate and ethylene | 1-5 |

-continued

| Component | Preferred Weight % |
| --- | --- |
| Emulsified polymer of vinyl acetate and an epoxy-functional vinyl monomer | 1-5 |
| Emulsified unsaturated polyester resin | 0.5-1.5 |
| Titanium acetyl acetonate | 0.5-1.5 |
| Quanternary ammonium salt | 0.01-0.2 |
| Hydrochloride | 0.005-0.1 |
| Cationic lubricant | 0.005-0.1 |
| 3-methacryloxypropyltrimethoxy silane | |

Other components can be included, if desired, but in order to ensure that the advantages of the invention are realized, it is preferred that other components be omitted unless it is found that no significant diminution of those advantages results from the inclusion thereof. In particular, since it is a principal object of the invention to provide a chrome-free sizing composition for glass fiber gun roving, no chromium compounds or complexes should be included in sizing compositions of the invention. However, since some of the components, e.g. the titanium acetyl acetonate and the cationic lubricant are solubilized by acids and/or lower alcohols, the inclusion of minor additional amounts of alcohols such as methanol, ethanol, propanol, isopropanol, etc. and/or acids such as hydrochloric or acetic may be found desirable.

The aqueous sizing compositions of the invention can be prepared following generally accepted mixing practices. These sizing compositions can be applied to the glass fibers using any convenient method. The amount of aqueous sizing composition applied is not narrowly critical but is preferably controlled so as to deposit on the glass fibers a size coating comprising the in situ dried residue of the aqueous sizing composition of the invention in an amount from about 0.5 to about 2 percent of the weight of the glass, taking into account the dilution of the non-volatile components in the aqueous sizing composition and the usual mechanical loss of some of the aqueous composition initially applied to the fibers before it is dried thereon.

Preferably, the aqueous sizing composition is applied to the glass fibers as they are produced by continuous drawing from the melt. While the aqueous sizing composition on the fibers may be at least partially dried before collection into a package, it is entirely satisfactory to gather the wet fibers into strands, preferably with about 100 to about 300 and, more preferably about 200 individual fibers to each strand, collecting these strands into packages as by winding on a collet, which also provides the tension for drawing the fibers, and then heating the package in a conventional circulating hot air oven to drive off volatile materials and deposit the non-volatile components of the sizing composition as a size coating on the fibers which will also bind together the individual fibers into a tightly integrated strand.

The integrated continuous glass fiber strands can be roved together in weakly integrated roving, preferably of about 30 to about 70 strands each, to produce a continuous glass fiber gun roving. While the diameter of the individual glass fibers is not narrowly critical, diameters from about 10 μm to about 13 μm are preferred.

INDUSTRIAL APPLICABILITY

EXAMPLE I

I prepared particularly advantageous chrome-free aqueous sizing compositions for glass fiber gun roving, according to the following formulations.

| Component | Weight Percent |
| --- | --- |
| Airflex 410 | 2.73 |
| Resyn 25-1971 | 7.47 |
| PE-700 | 0.65 |
| Tyzor AA | 0.77 |
| Larostat 264-A* | 0.28 |
| Emery 676OU | 0.03 |
| A-174 | 0.02 |
| Isoproponol | 1.40 |
| Acetic acid | 0.01 |
| Deionized water | balance |
| Percent solids in size | 6.5 to 7.1% |
| Recorded PH | 3.8 to 4.9 |
| Strand solids | 1.0 to 1.2% |

*Larostat 264-A antistatic agent which is soyadimethylethyl ammonium ethosulfate from Jordan Chemical Company.

EXAMPLE II (control)

The following is a control formulation similar to U.S. Pat. No. 4,473,618.

| Component | Weight Percent |
| --- | --- |
| Airflex 410 | 5.46 |
| Resyn 25-1971 | 4.74 |
| PE-700 | 0.65 |
| Tyzor AA | 1.1 |
| Y-9567 | 0.25 |
| Emery 676OU | 0.03 |
| A-174 | 0.02 |
| Isoproponol | 2.0 |
| Acetic acid | 0.01 |
| Deionized water | balance |

These compositions were applied to both H-fibers (about 10.1 to about 11.4 μm in diameter) and J-fibers (about 11.4 to about 12.7 μm diameter) with a conventional applicator as they were drawn from the melt, the wet fibers gathered into strands of about 200 individual fibers and wound into packages on a rotating collet in groups of 4 strands. The packages were dried in a conventional circulating hot air oven maintained at about 265° F. for about 12-14 hours, depending on the size of the package. The dried size coating thus deposited on the glass fibers constituted about 1.0 to about 1.3 percent of the weight of the glass and tightly integrated the strands. The strands from 13 packages of each type of H-fibers and 11 packages of each type of J-fibers were roved separately into weakly integrated gun roving by conventional means.

The glass fiber gun rovings so produced were found to exhibit exceptionally advantageous combinations of properties, particularly in view of the sizing compositions being chrome-free. Thus, they were found to chop easily and cleanly, to produce advantageously low levels of fuzz and fly, to wet out rapidly and fully with conventional unsaturated polyester matrix resins (the H-fiber roving being especially useful with unfilled matrix resin systems and the J-fiber roving with more viscous filled matrix resin systems, both of which can be chemically thickened, if desired). The dried strands unwound freely from the packages during roving with little or no disintegration of the strands, and the strands were sufficiently integrated in the roving so that postcure of the size coating after roving was not required; but, upon chopping and spraying at the gun, the pieces of roving separated advantageously into pieces of strand which maintained good integrity.

The unsaturated polyester resin laminates formed with these rovings exhibited excellent tensile strength and modulus, flexural strength and modulus, both dry and after immersion in boiling water for 24 hours, impact strength and other desirable characteristics.

EXAMPLE III

I tested the inventive size of Example I and the control of Example II for static reduction. While both permit excellent static reduction, the inventive size shows superior results. The control had an average voltage of 32.6 kV, while the inventive size had an average voltage of −6.6 kV.

I also tested the damping or stiffness of the rovings by measuring the damping in millivolts (mV). I recorded the amount of bending from a sample on a tuning fork having an oscillating amplitude of 1.000 milimeters at −10° C. Both samples had a damping of about 400 mV, e.g. the rovings were stiff. At temperatures ranging from 40° to 80° C.,* the control lost considerably more stiffness. For example, at 50° C., the control had a stiffness of 300 mV and the inventive roving had a stiffness of 350 mV. At 65° C.; the inventive roving measured about 310 mV whereas the control had dropped to 235 mV. Through the critical operating range, the inventive sized sample retained significantly more stiffness than did the control.

*the critical operating temperature range for the roving

I claim:

1. A glass fiber coated with the in situ dried residue of a substantially chrome-free aqueous sizing composition for glass fiber gun roving which comprises (A) a mixture of emulsified film-forming polymers comprising a polymer of vinyl acetate and ethylene, a polymer of vinyl acetate and an epoxy-functional vinyl monomer, and an unsaturated polyester resin: (B) titanium acetyl acetonate; (C) quaternary salt of ammonium ethosulfate; (D) a cationic lubricant; and (E) 3-methacryloxypropyltrimethoxysilane or hydrolysate thereof.

2. A coated glass fiber according to claim 1 wherein the coating comprises about 0.5 to about 2 percent of the weight of the glass.

3. A glass fiber gun roving comprising a plurality of coated glass fibers according to claim 1.

* * * * *